UNITED STATES PATENT OFFICE 2,504,154

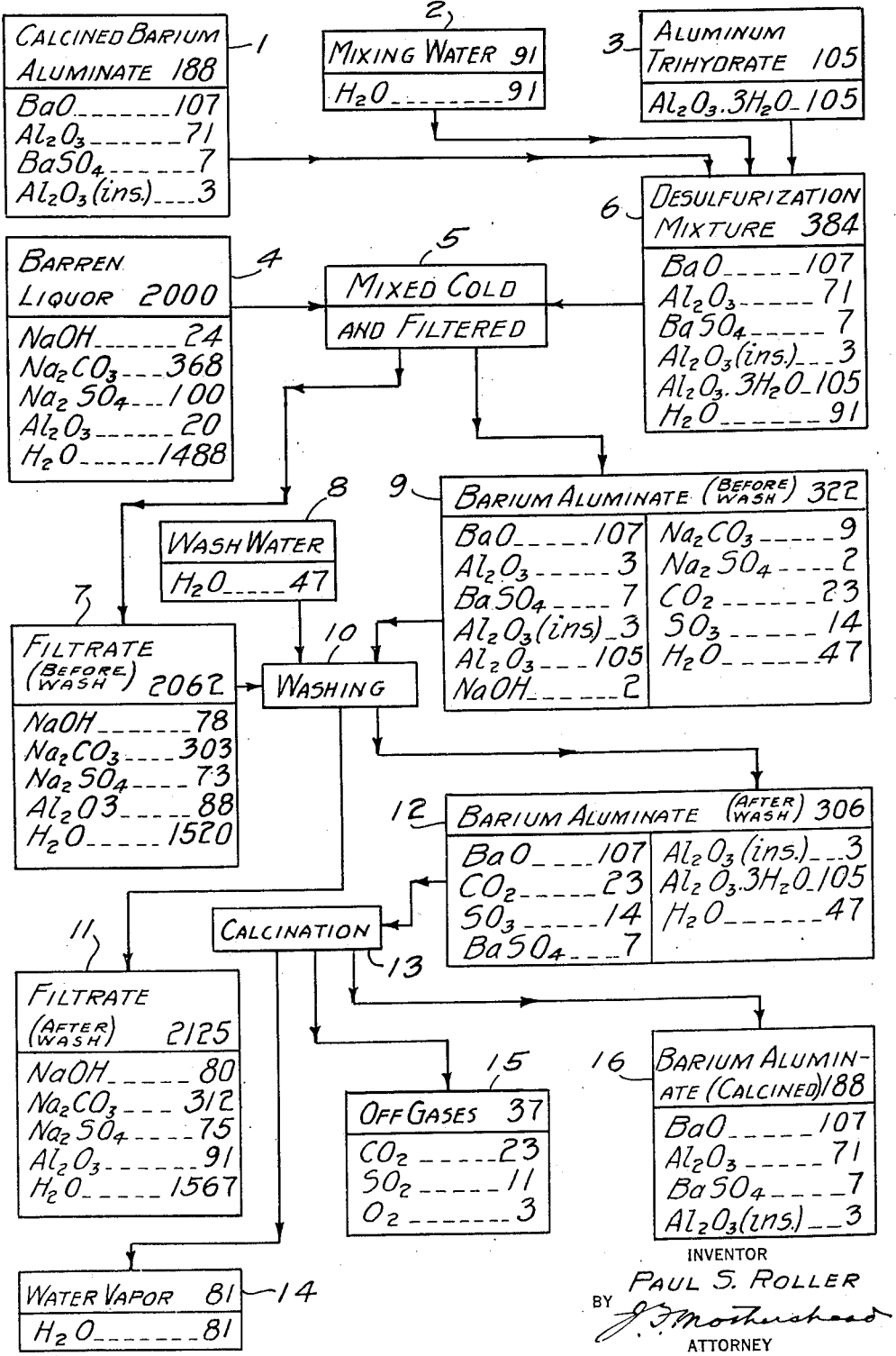

PROCESS FOR REMOVING IMPURITIES FROM MOTHER LIQUORS

Paul S. Roller, Hyattsville, Md., assignor to the United States of America as represented by the Secretary of the Interior Application July 10, 1946, Serial No. 682,521

3 Claims. (Cl. 23—52)

(Granted under the act of March 3, 1883, as amended April 30, 1928; 370 O. G. 757)

The invention described herein may be manufactured and used by or for the Government of the United States for governmental purposes without the payment to me of any royalty thereon, in accordance with the provisions of the act of April 30, 1928 (Ch. 460, 45 Stat. L. 467).

This invention relates to the removal of impurity from solutions, and more particularly to the removal of sulfate impurity from solution by treatment with barium aluminate.

Sulfate, such as the sulfate ion or radical of an alkali sulfate, may occur as an impurity, as in saline water, and its removal is often considered desirable. Barium carbonate has been used industrially for removal of the impurity. The barium carbonate reacts with the impurity to form insoluble barium sulfate and soluble alkali carbonate.

One disadvantage of the process involving barium carbonate is the difficulty of regenerating the barium carbonate from the barium sulfate that is formed. The barium sulfate when heated in a reducing atmosphere yields mainly barium sulphide. The conversion of the latter into barium carbonate may be effected by treating it with sodium carbonate and filtering, or by treatment with steam and carbon dioxide. Neither of these operations is usually considered economical.

It has been found that barium aluminate is a relatively simple and economical agent for the removal of sulfate impurity in the form of alkali sulfate. The equation for its action is:

(1) 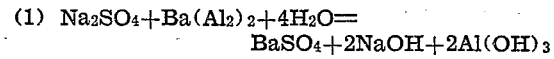
$Na_2SO_4 + Ba(AlO_2)_2 + 4H_2O =$
$BaSO_4 + 2NaOH + 2Al(OH)_3$

The sulfate is removed as an insoluble precipitate of barium sulfate. The alumina precipitates as insoluble aluminum hydroxide. If the solution containing the sulfate is alkaline, the precipitation of alumina will not be complete. Therefore, is is preferable that the solution be close to neutral. Neutralization of the solution during the sulfate removal may be secured and maintained according to any convenient and suitable conventional procedure.

The barium aluminate, according to this invention, is added in dry form or in an aqueous suspension to a solution containing sulfate as an impurity to be removed. The solution should have a temperature which is below its boiling point, which is preferably room temperature, and which may be below room temperature. When the aluminate is added to the solution, sulfate is removed as a precipitate in the form of barium sulfate. The barium aluminate is added in an amount determined by the desired amount of sulfate removal. To remove any specific amount of sulfate impurity, the barium aluminate is added in an amount in excess of the required stoichiometric quantity. Thus the amount of added barium aluminate is controlled by the amount of sulfate impurity to be removed.

The regeneration of the barium aluminate from barium sulfate is relatively easy. It is merely necessary to heat the mixture of precipitated barium sulfate and aluminum hydroxide at an elevated temperature above about 1200° C. The equation for the reaction is:

(2) 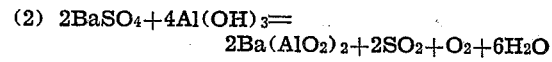
$2BaSO_4 + 4Al(OH)_3 =$
$2Ba(AlO_2)_2 + 2SO_2 + O_2 + 6H_2O$

The barium aluminate that is formed is a loose powder. It is easily ground to a fine mesh size, and may be reemployed for the further removal of sulfate.

In Equation 2 above, the composition of barium aluminate has been written to conform to the combination of one molecule of BaO with one molecule of $Al_2O_3$, or mono-barium aluminate. The formula for barium aluminate is sometimes given as $3BaO.Al_2O_3$, corresponding to tri-barium aluminate. However, investigations show that a compound higher than mono-barium aluminate does not exist. For the purpose of the present process, it is however not important how the formula of barium aluminate is written provided only that it represents with reasonable correctness the actual combination of BaO and $Al_2O_3$. If the actual combination is not correctly represented, then in regenerating the barium aluminate the proportion of $Al_2O_3$ derived from the aluminum hydroxide (Equation 2 above) will not be correctly adjusted to cause all of the barium sulfate to combine with it, leaving an undesired residue, after calcination, of either barium sulfate or alumina that will be unavailable for removal of the sulfate impurity from solution.

The alkalinity of the solution of liquor from which the sulfate is being removed may be so high that some alumina stays in solution. The dissolving of alumina may be mitigated or overcome by dilution of the liquor, by heating it in order to hydrolyze the alumina, or by partially neutralizing it with acid.

It is, therefore, an object of this invention to provide an improved process for removing sulfate impurity from solutions.

Another object is to provide a relatively simple process for removing sulfate impurity from solutions with a reagent which may be economically regenerated for reuse.

Still another object is to provide a process for reducing the sulfate impurity content of liquor being recycled in a lime-soda sinter process for producing alumina from bauxite.

A still further object is to provide a relatively simple process by which the sulfate impurity of solutions may be removed with the use of a relatively economical reagent.

Other objects and advantages of this invention will be apparent from the following description, the appended claims, and the accompanying drawing which presents a flow sheet for a preferred embodiment of the process of this invention.

In the following description, parts, percentages and ratios are by weight unless otherwise indicated.

The application of barium aluminate has been found to be particularly advantageous in removing sulfate impurity from solutions containing sodium carbonate. Trials have shown that for such solutions barium carbonate is quite ineffective for the removal of sulfate. The reason for this probably is the relative insolubility of barium carbonate in solutions rich in sodium carbonate, which prevents the barium carbonate from acting.

*Example 1*

A carbonate-rich liquor containing sulfate, to which barium aluminate has been successfully applied, is one that occurs in the soda-lime process for the recovery of alumina from bauxite. This liquor contains sulfate derived from the bauxite or clay, or from coal. The liquor, were it not for its high sulfate content, would be recycled directly to the lime-soda process for use within the process. Due to the uptake of sulphur however, it is necessary to remove a part of the sulfate content of the liquor before it is suitable for recycle in the soda-lime process.

It has been found that the sulfate content of the soda-lime liquor is effectively reduced by treating it with barium aluminate. Barium carbonate on the other hand has been found to be ineffective to reduce the sulfate content.

A high carbonate or carbonate-rich mother liquor of the type occurring in the lime-soda process may have the following composition:

| | Per cent |
|---|---|
| $Na_2CO_3$ | 13.91 |
| $NaOH$ | 4.89 |
| $Na_2SO_4$ | 5.00 |
| $Al_2O_3$ | 2.62 |
| $H_2O$ | 73.58 |

As shown in the next two succeeding paragraphs, treatment of such liquors having such composition with barium aluminate and barium carbonate demonstrates their relative merits.

To 100 parts of the high carbonate liquor is added 0.85 part of barium aluminate, which corresponds stoichiometrically to a sulfate removal of 16.9% of the sulfate content of the liquor. After 18 hours of stirring at room temperature, 8.6% of the sulfate content of the liquor was removed.

To another 100 parts by weight of the high carbonate liquor was added 1.75 parts by weight of precipitated barium carbonate corresponding stoichiometrically to a sulfate removal of 37.9% of the sulfate content of the liquor. The mixture was stirred for 22 hours at room temperature. No sulfate was removed.

Thus the barium aluminate removes about one-half of the maximum sulfate and is effective for such purpose, whereas barium carbonate removes none and is ineffective.

Various factors have been found to affect the sulfate impurity removal by barium aluminate. No appreciable removal is obtained if the liquor is at the temperature at which it boils. Increasing the fineness of the barium aluminate from minus 200 mesh to minus 325 mesh increases the amount of sulfate removed. Increasing the relative amount of barium aluminate or of the time of its contact with the liquor also increases the amount of removed sulfate. The greater the ratio of carbonate to sulfate in the liquor, the less is the amount of removed sulfate. Thus, with the sodium sulfate content at 4.96%, 26.2% of the sulfate in solution is removed when the ratio of sodium carbonate to sodium sulfate is 2.76, while but 16.2% is removed when the ratio is 3.60. For a given ratio of sodium carbonate to sodium sulfate, the removal of sulfate is facilitated by dilution of the liquor with water. A 10% dilution with water of a liquor having approximately the above composition results in a 15% increase in the sulfate removal.

A particularly important aid to the sulfate removal is secured by pre-mixing the barium aluminate with water instead of adding it dry to the liquor. The advantage is demonstrated by treatment of three separate batches of liquor of substantially the above composition. To each batch of 100 parts of liquor is added 9.6 parts of barium aluminate. To one batch, the aluminate is added in dry state. To the second batch, the aluminate is added in the form of an aqueous suspension after being premixed with 10 parts of water for fifteen minutes. For the third batch, the aluminate is premixed with 10 parts of water for sixty minutes. The resulting aqueous suspension is then added to the third batch. In each batch, the barium aluminate is stirred in contact with the liquor for about eighteen hours at room temperature. The results are as follows:

| Method of Addition of Barium Aluminate | Per cent Sulfate Removal (Potential Removal 65%) |
|---|---|
| Dry | 13.3 |
| 15 Minutes premix | 20.5 |
| 60 Minutes premix | 23.3 |

Thus, when adding the barium aluminate to the liquor in the form of a suspension, an increase of about 50% is obtainable over that when the barium aluminate is added in dry form. The increase is greater when the premixing time is increased from fifteen minutes to sixty minutes.

In carrying out a sulfate removal under preferred conditions, the high carbonate liquor obtained in the lime-soda process is treated with barium aluminate at room temperature, generally for about eighteen hours. After reaction of the barium aluminate with the liquor, the precipitate of barium sulfate is filtered. The filtrate, now reduced in sulfate content, is recycled to the lime-soda process proper. The precipitate may contain some alumina, but much more of the latter will remain dissolved in the alkaline liquor, to a degree that increases with increase in alkalinity. However, the dissolved alumina is substantially recovered in the treatment which the liquor subsequently receives in the lime-soda process.

In order to regenerate the barium aluminate from the barium sulfate that is formed, the stoichiometric amount of alumina trihydrate which is available from the lime-soda process, is mixed with the barium sulfate. The mixture is dried and calcined to give barium aluminate.

Because of the high carbonate content of the liquor, part of the barium aluminate may be converted to barium carbonate, as well as to barium sulfate. For this reason, an excess of barium aluminate is generally required. In addition, an excess increases the rate of sulfate removal.

*Example 2*

The removal of sulfate impurity by means of barium aluminate has been developed as a cyclic process in which the barium sulfate is reformed into barium aluminate and the latter reemployed on a fresh batch of liquor. The process is described with reference to a carbonate-rich liquor occurring in the lime-soda sinter process for producing alumina from bauxite. The flow sheet of operations in the sulfate removal is given in the attached figure. The flow sheet shows a total of sixteen compositions and steps, each of which is separately numbered. It is based upon 2000 pounds of liquor to be treated; each box gives the composition, its weight in pounds, the name of the components, and their respective weights.

In the flow sheet of the drawing regenerated barium aluminate entraining some unreacted barium sulfate 1 is combined into a slurry (called a desulfurization mixture 6), with mixing water 2 and with alumina trihydrate 3. The latter is the make-up material for reaction with the subsequently formed barium sulfate. The alumina trihydrate is added at this point in order to obtain good mixing with the barium sulfate subsequently to be formed from the barium aluminate.

The desulfurization mixture 6 is mixed in the cold 5 with the liquor to be treated 4 for about eighteen hours. The reacted mixture is then filtered 5, yielding a wet solid 9 and a filtrate 7. The solid 9 is washed 10 with water 8, giving a washed, wet solid 12 and a combined filtrate 11. The latter has a sulfate content substantially lower than the original liquor 4, and is ready to be returned to the lime-soda process proper. The washed solid 12 is calcined 13, yielding water vapor 14, gases 15 and regenerated barium aluminate 16 or 1.

It is possible to remove a much larger quantity of sulfate than indicated in the flow sheet by employing more barium aluminate. However, for the needs of the lime-soda process, the removal of the indicated amount of sulfate is sufficient.

The foregoing is to be understood as illustrative, since this invention includes all embodiments and modifications coming within the scope of the appended claims.

I claim:

1. In the treatment of carbonate-rich mother liquor for recycling in the lime soda sinter process to produce alumina from bauxite, said liquor containing soluble sulfate as an impurity and being substantially saturated with alumina hydrate, the improvement comprising: preparing a slurry of barium aluminate, alumina trihydrate, and water; treating said liquor intermediate successive cyclic runs with said slurry to produce a reaction of said barium aluminate with the sulfate impurity and secure a precipitate of barium sulfate and alumina trihydrate; separating said precipitate from the mother liquor; and calcining said separated precipitate to regenerate barium aluminate.

2. In the treatment of carbonate-rich mother liquor for recycling in the lime-soda sinter process to produce alumina from bauxite, the said liquor containing soluble sulfate as an impurity and being substantially saturated with alumina hydrate, a method of eliminating the sulfate impurity of said liquor, said method comprising the steps of mixing barium aluminate with said liquor to produce a reaction of said aluminate with said sulfate impurity and thereby secure a precipitate of barium sulfate, mixing alumina with said barium sulfate, and calcining said mixture of barium sulfate and alumina to regenerate the barium aluminate.

3. In the treatment of carbonate-rich mother liquor for recycling in the lime-soda sinter process to produce alumina from bauxite, the said liquor containing soluble sulfate as an impurity and being substantially saturated with alumina hydrate, a method of eliminating the sulfate impurity of said liquor, said method comprising the steps of preparing an aqueous suspension of barium aluminate, mixing said suspension with said mother liquor to produce a reaction of said aluminate with said sulfate impurity and thereby secure a precipitate of barium sulfate, mixing alumina with said barium sulfate, and calcining said mixture of barium sulfate and alumina to regenerate the barium aluminate.

PAUL S. ROLLER.

REFERENCES CITED

The following references are of record in the file of this patent:

UNITED STATES PATENTS

| Number | Name | Date |
|---|---|---|
| 1,274,145 | Detwiller | July 30, 1918 |
| 1,688,054 | Morey | Oct. 16, 1928 |
| 1,772,360 | Mitchell | Aug. 5, 1930 |
| 1,856,194 | Seailles | May 3, 1932 |
| 2,021,699 | Preisman | Nov. 19, 1935 |
| 2,356,626 | Seailles | Aug. 22, 1944 |
| 2,375,342 | Brown | May 8, 1945 |
| 2,440,378 | Newsome | Apr. 27, 1948 |

FOREIGN PATENTS

| Number | Country | Date |
|---|---|---|
| 6,096 | Great Britain | of 1896 |

Certificate of Correction

Patent No. 2,504,154                                April 18, 1950

PAUL S. ROLLER

It is hereby certified that errors appear in the printed specification of the above numbered patent requiring correction as follows:

Column 1, line 34, for that portion of the equation reading "$(Al_2)_2$" read $(AlO_2)_2$; line 42, for "is is" read *it is*;

and that the said Letters Patent should be read with these corrections therein that the same may conform to the record of the case in the Patent Office.

Signed and sealed this 1st day of August, A. D. 1950.

[SEAL]

THOMAS F. MURPHY,
*Assistant Commissioner of Patents.*